(12) United States Patent
Chan et al.

(10) Patent No.: US 9,509,737 B2
(45) Date of Patent: Nov. 29, 2016

(54) CLIENT SIDE ENCRYPTION WITH RECOVERY METHOD

(71) Applicant: NEXTBIT SYSTEMS INC., San Francisco, CA (US)

(72) Inventors: Michael A. Chan, San Francisco, CA (US); Justin Quan, San Francisco, CA (US); Michael K. Fleming, San Francisco, CA (US)

( * ) Notice: Subject to any disclaimer, the term of this patent is extended or adjusted under 35 U.S.C. 154(b) by 317 days.

(21) Appl. No.: 14/044,049

(22) Filed: Oct. 2, 2013

(65) Prior Publication Data

US 2014/0101451 A1    Apr. 10, 2014

Related U.S. Application Data

(60) Provisional application No. 61/708,794, filed on Oct. 2, 2012.

(51) Int. Cl.
*G06F 17/30* (2006.01)
*H04L 29/06* (2006.01)
(Continued)

(52) U.S. Cl.
CPC ............... *H04L 65/60* (2013.01); *G06F 8/62* (2013.01); *G06F 8/63* (2013.01); *G06F 9/4406* (2013.01); *G06F 9/4416* (2013.01); *G06F 17/3007* (2013.01); *G06F 17/3015* (2013.01); *G06F 17/30085* (2013.01); *G06F 17/30091* (2013.01); *G06F 17/30194* (2013.01); *H04L 9/0825* (2013.01); *H04L 9/3226* (2013.01); *H04L 43/04* (2013.01); *H04L 65/4069* (2013.01); *H04L 67/10* (2013.01); *H04L 67/1095* (2013.01); *H04L 67/1097* (2013.01); *H04L 67/2823* (2013.01); *H04L 67/2842* (2013.01); *H04L 67/40* (2013.01); *H04L 67/42* (2013.01); *H04W 8/24* (2013.01); *G06F 17/30011* (2013.01);
(Continued)

(58) Field of Classification Search
CPC .......... H04L 67/1097; H04L 65/4069; H04L 65/60; G06F 17/30085; G06F 8/62; G06F 8/63; G06F 9/4406; G06F 9/4416; G06F 17/30011; G06F 17/30286; Y02B 60/188; H04W 8/24
See application file for complete search history.

(56) References Cited

U.S. PATENT DOCUMENTS 5,852,713 A * 12/1998 Shannon ............. G06F 11/1451
707/999.102
2005/0223216 A1* 10/2005 Chan .................... H04L 63/083
713/153

(Continued)

OTHER PUBLICATIONS

Co-Pending U.S. Appl. No. 14/044,046 by Chan, M.A. et al., filed Oct. 2, 2013.

*Primary Examiner* — Oleg Korsak

(57) ABSTRACT

Technology is disclosed herein for client side data encryption with a recovery mechanism. According to at least one embodiment, a computing device encrypts at least one data set into an encrypted data set using a private encryption key. The computing device encrypts the private encryption key using a password provided by a user of the device. The password is also encrypted using the user's answers to password recovery questions. The encrypted data set, the encrypted key and the encrypted password are transmitted to and stored by a server. The computing device can retrieve and decrypt the encrypted data set form the server. The encryption key can be recovered by decrypting the encrypted key using the password. The password can be recovered by decrypting the encrypted password using answers to the password recovery questions provided by the user.

20 Claims, 8 Drawing Sheets

(51) Int. Cl.
*H04L 29/08* (2006.01)
*H04L 12/26* (2006.01)
*H04L 9/08* (2006.01)
*H04L 9/32* (2006.01)
*G06F 9/44* (2006.01)
*G06F 9/445* (2006.01)
*H04W 8/24* (2009.01)

(52) U.S. Cl.
CPC ........ *G06F 17/30286* (2013.01); *Y02B 60/188* (2013.01)

(56) References Cited

U.S. PATENT DOCUMENTS

| | | | |
|---|---|---|---|
| 2008/0031447 A1* | 2/2008 | Geshwind | H04L 9/0822 380/46 |
| 2009/0168994 A1* | 7/2009 | Heuss | H04L 9/06 380/28 |

\* cited by examiner

CLIENT SIDE ENCRYPTION WITH RECOVERY METHOD

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

FIELD OF THE INVENTION

At least one embodiment of the present invention pertains to mobile devices, and more particularly, to mobile devices containing encrypted data.

BACKGROUND

Mobile computing devices become increasingly popular. Unauthorized access of the mobile computing devices can jeopardize privacy and confidentiality of the users of the devices. Data security of the mobile computing devices becomes an important issue in view of the popularity of the mobile computing devices.

Typically, login password mechanism embedded in the operating system and/or the BIOS of the computing devices is used to prevent unauthorized log-ins into the devices. However, even with the log-in password protection, the data contents of a computing device can still be accessed by physically removing the storage component from the computing device and plugging the storage component to another device with total access control.

A data encryption method can be used to encrypt data stored in the computing device. The encrypted data cannot be compromised by a hacker even when the storage component is removed from the computing device, unless the hacker knows the encryption key. However, the user of the computing device may lose the encryption key. Since the data stored in the computing device are encrypted using the encryption key, even the user cannot access the contents of the data without the encryption key. Further, if the hacker finds out the location where the key is stored and receives the key from the location, data security can be compromised as the hacker is able to access the data using the key.

SUMMARY

Technology introduced herein provides a mechanism for client side data encryption with recovery process. According to at least one embodiment, a computing device encrypts at least one data set into an encrypted data set using a private encryption key. The computing device further encrypts the private encryption key using a password provided by a user of the device. The password is also encrypted using the user's answers to password recovery questions. The encrypted data set, the encrypted key and the encrypted password are transmitted to and stored by a server. The computing device can retrieve and decrypt the encrypted data set form the server.

Even if the encryption key is not available to the computing device or a new computing device replacing this computing device, the encryption key can be recovered by decrypting the encrypted key using the password. If the password is not available to the computing device or a new computing device replacing this computing device, the password can be recovered by decrypting the encrypted password using answers to the password recovery questions provided by the user.

Therefore, the encrypted data of the computing device and the encryption information are securely stored in the server, while the server cannot access contents of the encrypted data. The computing device or a new computing device replacing this computing device can recover any of the encrypted data by downloading the encrypted data set, the encrypted key and the encrypted password from the server.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
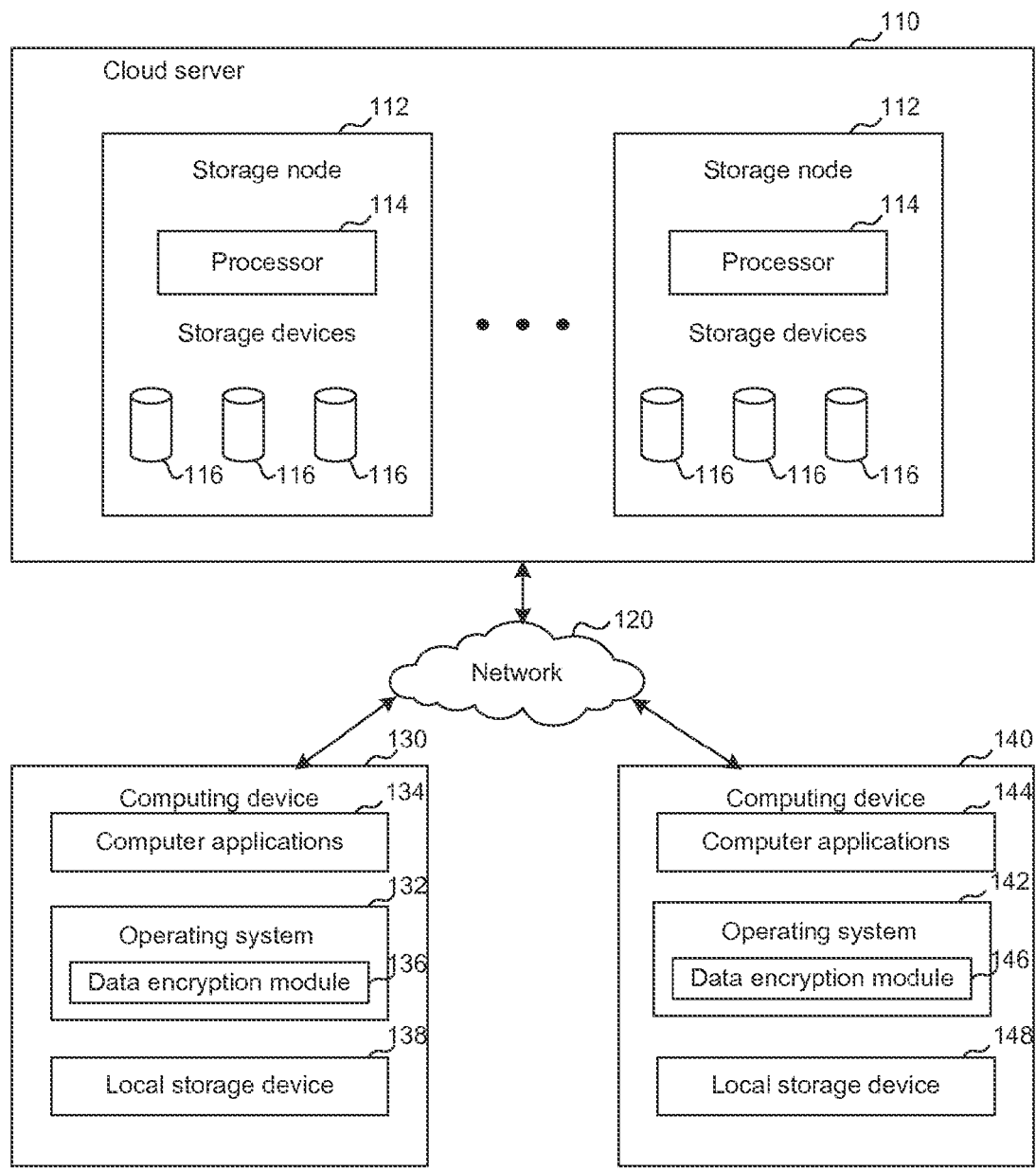
FIG. 1 illustrates an example system for computing devices connected to a cloud server for data encryption.

FIG. 1 illustrates an example system for computing devices connected to a cloud server for data encryption. The system includes a cloud server 110 configured to communicate with the computing devices. In one embodiment, the cloud server 110 can be a server cluster having computer nodes interconnected with each other by a network. The cloud server 110 can contain storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 130 and 140 can each communicate with the cloud server 110 via network 120. The network 120 can be, e.g., the Internet. Although FIG. 1 illustrates two computing devices 130 and 140, a person having ordinary skill in the art will readily understand that the technology disclosed herein can be applied to a single computing device or more than two computing devices connected to the cloud server 110.

The computing device 130 includes an operating system 132 to manage the hardware resources of the computing device 130 and provides services for running computer applications 134 (e.g., mobile applications running on mobile devices). The computer applications 134 stored in the computing device 130 require the operating system 132 to properly run on the device 130. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 can include a data encryption module 136 to encrypt the data for the computing device 130 and secure the encryption key with recovery methods. The data encryption module 136 may continuously monitor the file system of the computing device 130 and encrypt any newly generated data for the device 130 in real time. The data encryption module 136 may further communicate with the cloud server 110 to secure the encryption key.

In one embodiment, the data encryption module 136 generates a private encryption key and uses the private encryption key to encrypt all data for the computing device 130. A user of the computing device 130 determines a password and provides the password to the computing device 130 via, e.g., an input component of the computing device 130. The computing device 130 receives the password and encrypts the private encryption key using the password to generate an encrypted keystore (e.g., an encrypted private encryption key). The computing device 130 may transmit the encrypted data for device 130 and the encrypted keystore to the cloud server 110. The cloud server 110 therefore can store the encrypted versions of the device data and private encryption key without the ability to access the decrypted content.

The computer applications 134 running at the computing device 130 (e.g. foreground components of the computer applications 134) need not be aware that the data for the device 130 are encrypted. The data encryption module 136 is responsible for conduct the encryption process. Furthermore, when any of computer applications 134 needs to read the data, the data encryption module 136 can decrypt the corresponding encrypted data so that the application can access the data content.

Figure 2:
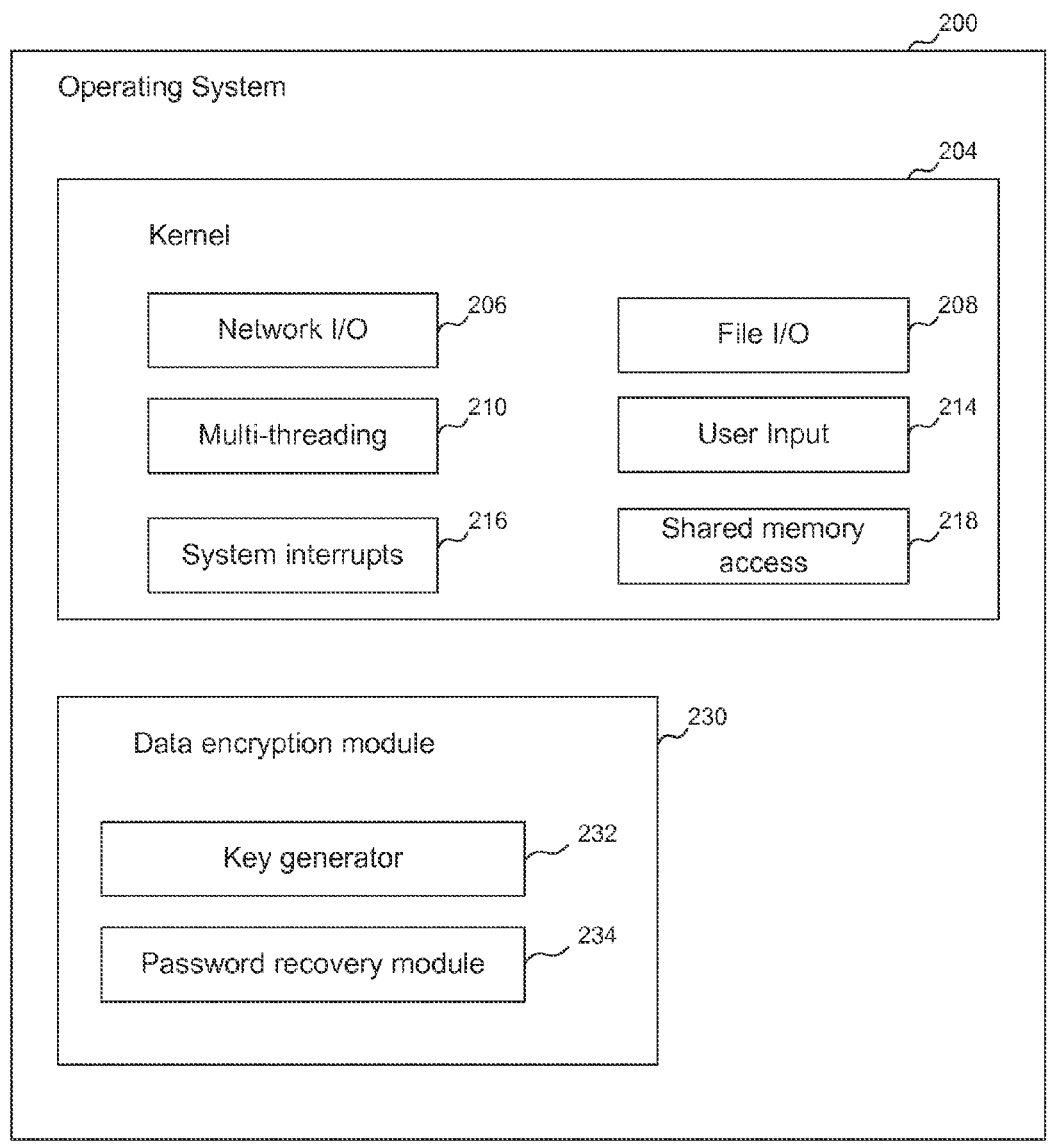
FIG. 2 illustrates an example operating system of a computing device for data encryption.

FIG. 2 illustrates an example operating system of a computing device for data encryption, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

The user input 214 may be responsible to receive inputs from a user of the device regarding the encryption. For instance, the user input 214 may receive the encryption password from the user. The multi-threading module 210 may be used to manager multiple threads for different tasks. For instance, there can be a thread for generating new data and another thread for encrypting the newly generated data.

A data encryption module 230 can run on top of the kernel 204. Alternatively the kernel 204 can be modified to include the data encryption module 230. The app migration module 230 is responsible for encrypting the data for the device and securing the encryption key. The data encryption module 230 may include a key generator 232 and a password recovery module 234. The key generator 232 may generate a random key as the private encryption key for encrypting the data for the device. Alternatively, the key generator 232 may receive a key (e.g., a string or a number) from a user of the device as use the received the key as the private encryption key. The key generator 232 can also treat the received key as an initial seed for the encryption key and generate the encryption key based on the initial seed via a pseudorandom algorithm. The data encryption module 230 protects the private encryption key by encrypting the key using a password provided by the user of the device.

The password recovery module 234 is responsible for recovering the password in case the user forgets the password. For instance, initially the password recovery module 234 can prompt the user to answer a number of challenge questions. The answers of the challenge questions are used to encrypt the password. The encrypted password is stored in the cloud server. When a user requests to recover the password, the password recovery module 234 asks for the answers to the challenge questions. Meanwhile the password recovery module 234 may retrieve the encrypted password from the cloud sever. Upon receiving the answers from the user, the password recovery module 234 uses the received answers to decrypted the password. If the password is decrypted successfully, the data encryption module 230 can use the password to decrypt the private encryption key, and in turn use the private encryption key to decrypt the data for the device.

Figure 3:
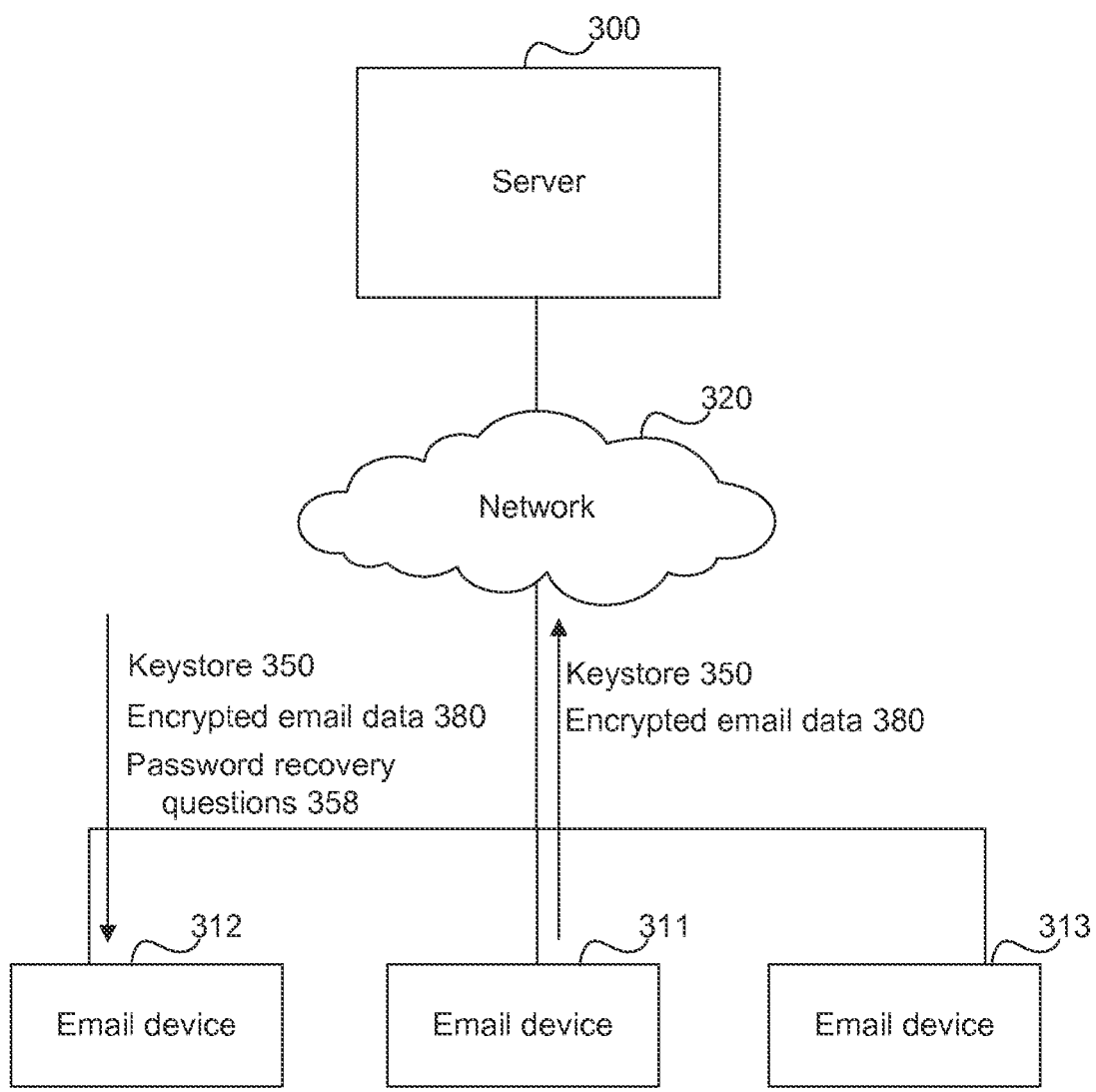
FIG. 3 illustrates an example of email devices connected to a cloud-based server storing encrypted data.

The technology disclosed herein can be applied to various computing devices including, e.g., devices capable of receiving emails or internet messages. For instance, FIG. 3 illustrates an example of email devices connected to a cloud-based server storing encrypted data. As depicted in FIG. 3, a server 300 may provide a cloud-based service for storing encrypted data and encryption keys for the devices. The network 320 can be, e.g., the Internet. Examples of email devices 311, 312 and 313 may include, but are not limited to, a mobile phone, a smartphone, a personal digital assistant (PDA), a tablet, a mobile game console, a laptop computer, a desktop computer, or any other devices having communication capability.

Although FIG. 3 illustrates devices for email data as an example, a person having ordinary skill in the art can ready understands that a device can use a private encryption key to encrypt different types of data, e.g., game data, photo data, video data, audio data, user data, application program data, operating system data, etc. In some embodiments, all data of a device can be encrypted and transmitted to a server.

Figure 4:
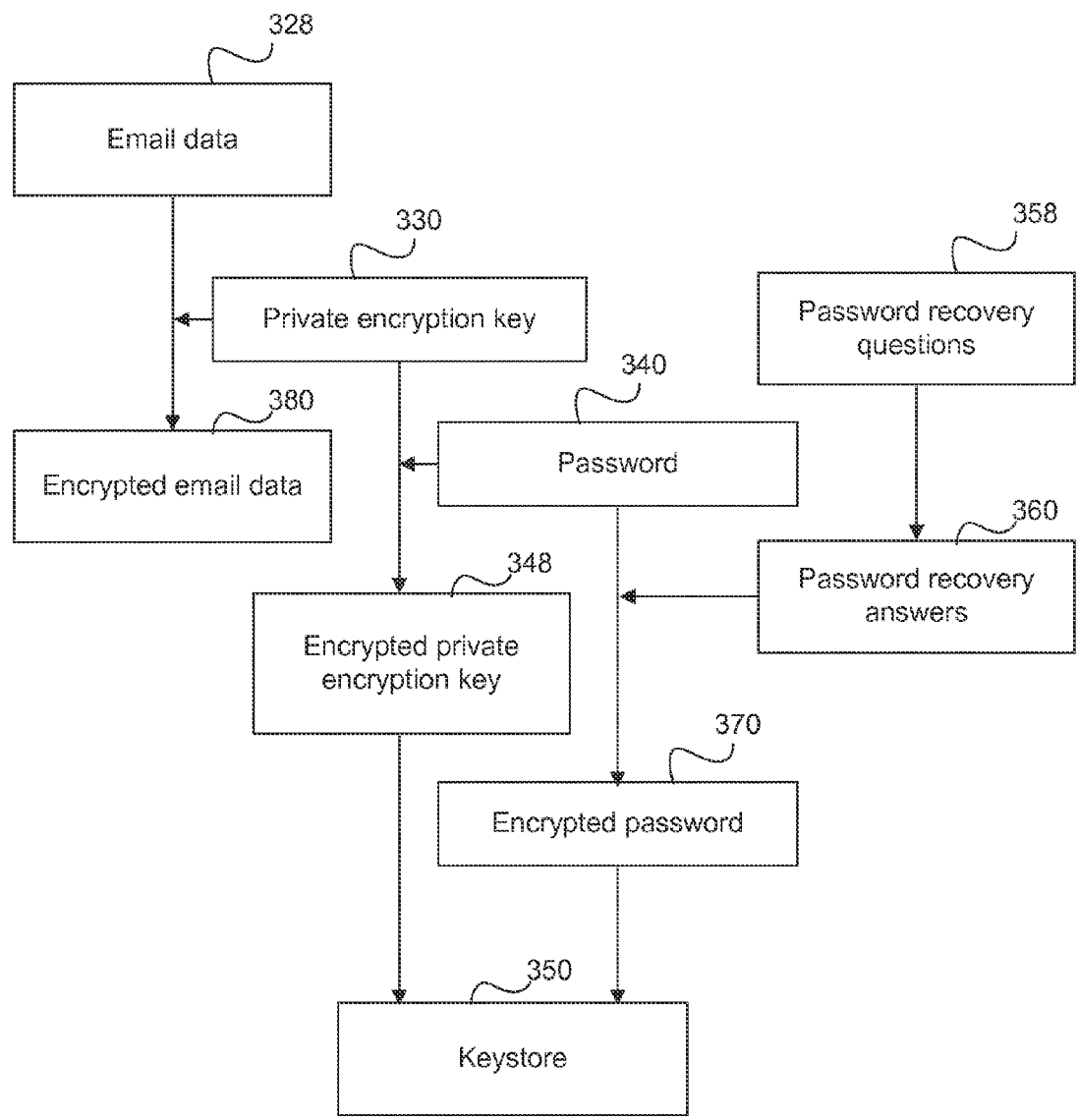
FIG. 4 illustrates an example of an encryption process for the email data.

Assuming that a user initially owns an email device 311. The email device conducts an encryption process for the email data as illustrated in FIG. 4. The email device 311 generates a private encryption key 330 and uses the private encryption key 330 to encrypt all email data 328 for the email device 311. The encrypted email data 380 are sent to the server 300 for storage.

The email device 311 further prompts a user of the device 311 to enter a password 340. The email device 311 protects this private encryption key 330 by encrypting the key 330 using a password key based on a password 340. The encrypted private encryption key 348 can be stored in a keystore 350 (e.g., a data structure including an encrypted private encryption key 348). The keystore 350 can be, e.g., a file or a string.

The email device 311 also prompts the user to answer a plurality of password recovery questions 358. The answers 360 to the questions are used to encrypt the password 340 to an encrypted password 370. The encrypted password may be stored as part of the keystore 350. In other words, the keystore 350 can include both an encrypted version of the private encryption key and an encrypted version of the password. The keystore 350 is sent to the server 300 for storage as well.

Without the access to the content of the encrypted password 370, the server 300 is unable to access the private encryption key 330, and in turn unable to decrypt the encrypted email data 380.

In some embodiments, the email device 311 needs not store all email data for the device 311 itself, since the server 400 stores all the encrypted email data 380. The email device 311 can retrieve any of the encrypted email data 380 from the server 400. Then the email device 311 can decrypt the retrieved email data 380 using the private encryption key 330 stored in the email device 311.

Figure 5:
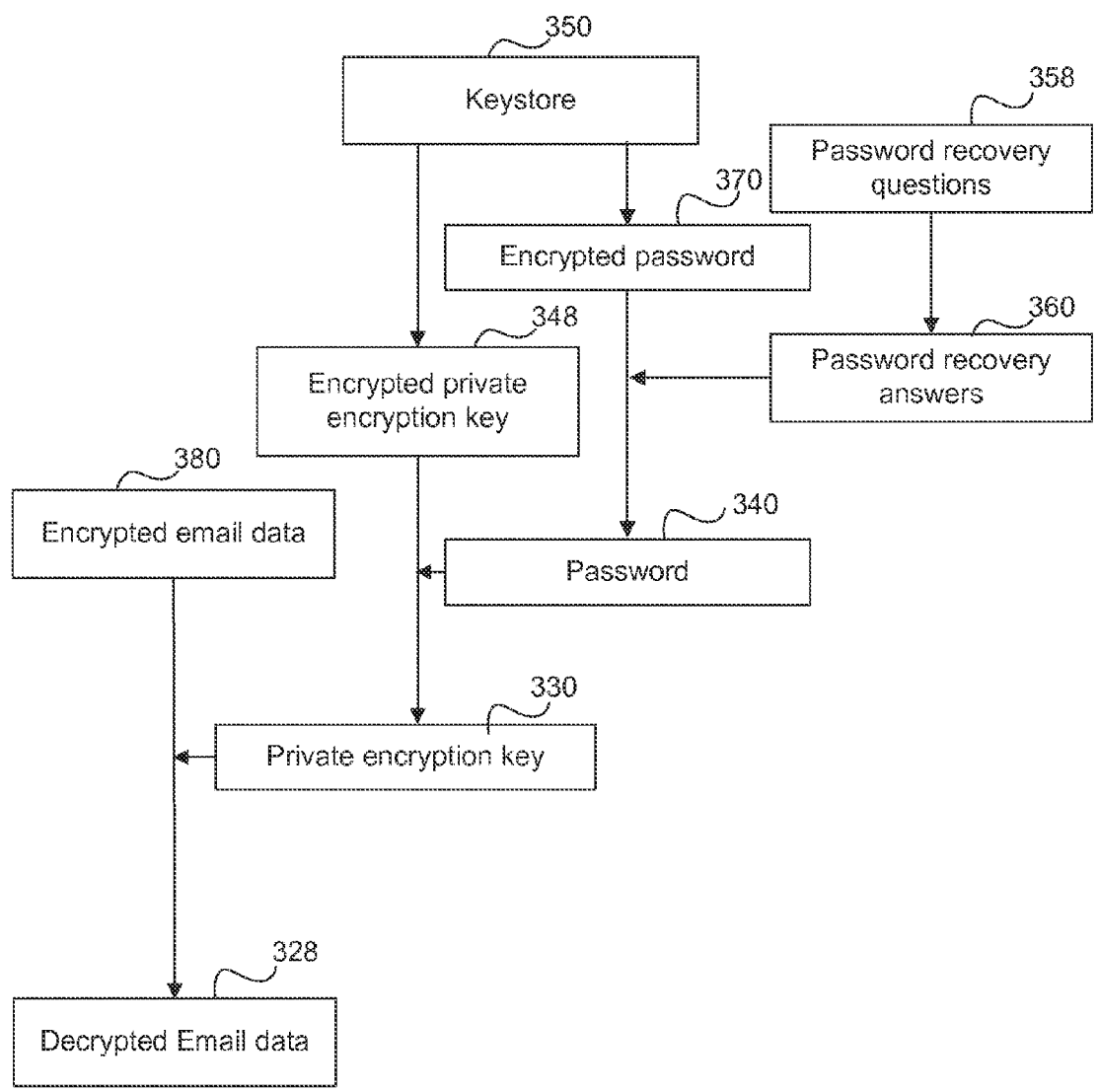
FIG. 5 illustrates an example of an email data recovery process.

There can be events when the private encryption key 330 is not available. For instance, the email device 311 may accidentally delete or destroy the private encryption key 330, or the storage of the email device 311 storing the key 330 is broken. Alternatively, the email device 311 may be broken or lost. In such an event, the user has an option to recover the private encryption key 330 and the email data 328, as illustrated in FIG. 5.

For instance, when the user receives a new email device 312 as a replacement of a lost email device 311, the user logs in the new email device 312 and the email device 312 connects to the server 300. The email device 312 downloads the keystore 350 and encrypts email data 380 from the server 400 as shown in the FIG. 3A. The email device 312 then presents a password prompt for the user to provide the password 340 again. Upon receiving the password 340, the email device 312 can use the password 340 to decrypt the keystore 350 to access the private encryption key 330, and in turn use the key 330 to decrypt the encrypted email data 380.

In an event that the user lost or does not remember the password during the recovery process, the email device 312 can request the server 300 to send an email to an email address associated with the user for confirmation of the user identity. The user accesses that email and clicks a confirmation link to confirm the user identity. Then server 300 sends a confirmation message and the password recovery questions 358 to the email device 312. The email device 312 prompts the user with the password recovery questions 358. If the user provides correct answers 360 to the questions 358, the email device 312 can decrypt the encrypted password (e.g., stored in the keystore 350) to recover the password 340. With the correct password 340, the email device 312 is able to decrypt the keystore 350 to generate the private encryption key 330, and in turn to use the key 330 to decrypt the encrypted email data 380.

A person having ordinary skill in the art can readily understands that the types of device illustrated in FIG. 3 can be different. For example, email devices 311, 312 and 313 can be, e.g., tablets, smart phones or laptop computers respectively. The server 300 is capable of store encrypted and encrypted keys for these different types of devices.

Figure 6:
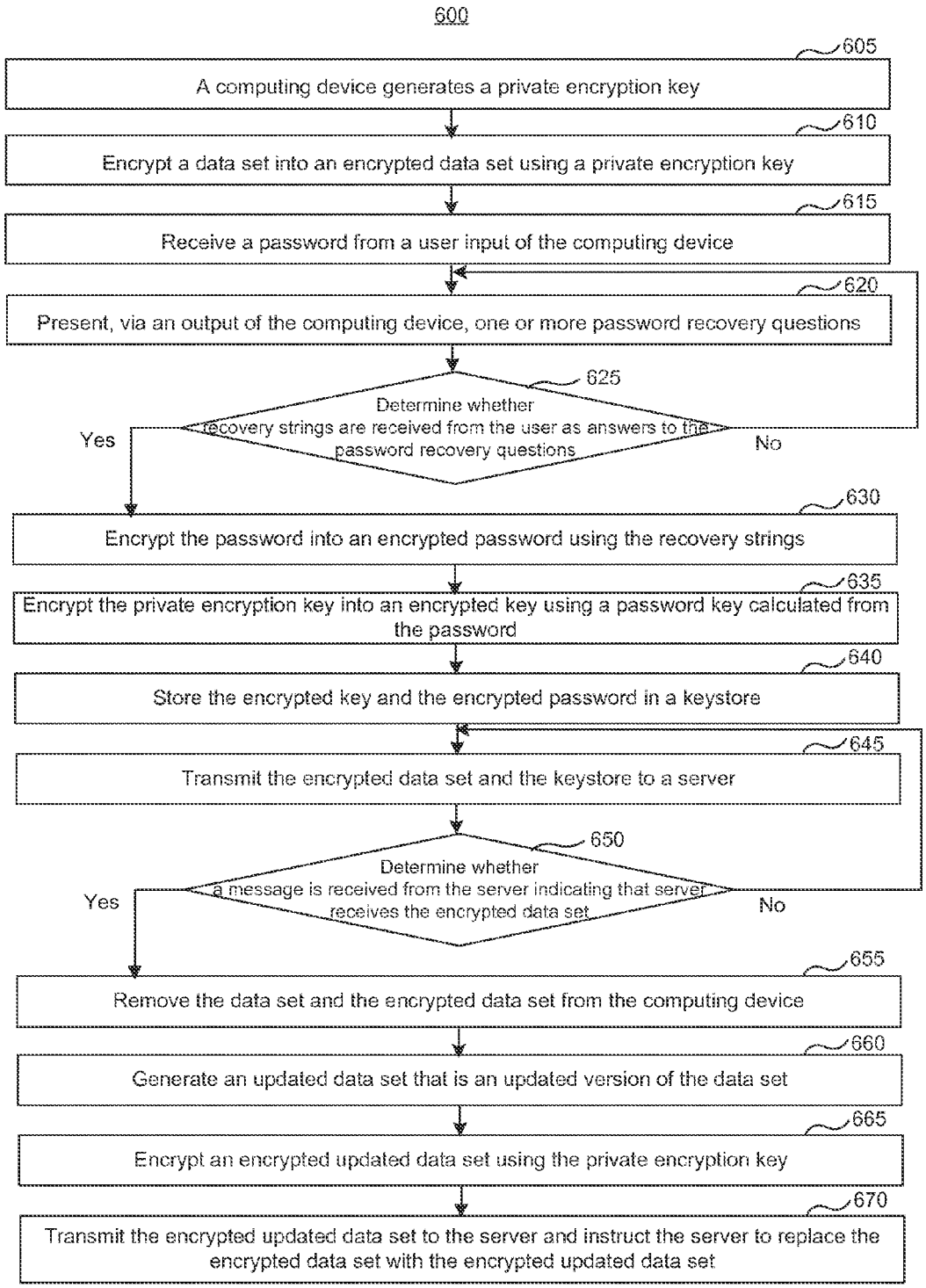
FIG. 6 illustrates an example of a process for client side data encryption with recovery mechanism.

As illustrated in the figures, computing devices can communicate with the cloud server to store encrypted data and encryption keys. The cloud server acts as a remote backup device for storing the encrypted data for the computing device, but without the ability to access the contents of the encrypted data. FIG. 6 illustrates an example of a process 600 for client side data encryption with recovery mechanism. The process 600 starts at step 605, where a computing device generates a private encryption key. Alternatively, the private encryption key may be provided by a user of the computing device.

At step 610, the computing device encrypts a data set into an encrypted data set using a private encryption key. The encrypted data set can only be decrypted back to the data set by using the private encryption key. The data set can include, e.g., one or more files of the computing device. In some embodiments, the computing device can encrypt all data of the device using the private encryption key.

At step 615, the computing device receives a password from a user input of the computing device. The password can be provided by the user of the device. At step 620, the computing device further presents, via an output of the computing device, one or more password recovery questions. At step 625, the computing device determines whether recovery strings are received from the user as answers to the password recovery questions. At step 630, if the recovery strings are received, the computing device encrypts the password into an encrypted password using the recovery strings. Otherwise the process 600 continues to prompt the password recovery questions at step 620.

At step 635, the computing device encrypts the private encryption key into an encrypted key using a password key calculated from the password. The password key can comprise the password or be the password. Optionally at step 640, the computing device stores the encrypted key and the encrypted password in a keystore. The steps of encrypting the data set, encrypting the private encryption key and encrypting the password can use different encryption methods, or alternatively a common encryption method.

At step 645, the computing device transmits the encrypted data set and the keystore to a server. The server stores the encrypted data set, the encrypted key and the encrypted password for the computing device. The server is unable to access contents of the encrypted data set by using the encrypted key or the encrypted password.

The computing device may avoid storing the data set once the server stores the encrypted data set. At step 650, the computing device determines whether a message is received from the server indicating that server receives the encrypted data set. If the message is received, in response at step 655, the computing device removes the data set and the encrypted data set from the computing device. Otherwise, the process 600 may transmit the encrypted data set again to the server at step 645.

The computing device may continue encrypt newly generated data and updated the encrypted data stored in the server. At step 660, the computing device generates an updated data set that is an updated version of the data set. At step 665, the computing device encrypts an encrypted updated data set using the private encryption key. At step 670, the computing device transmits the encrypted updated data set to the server and instructs the server to replace the encrypted data set with the encrypted updated data set.

Figure 7:
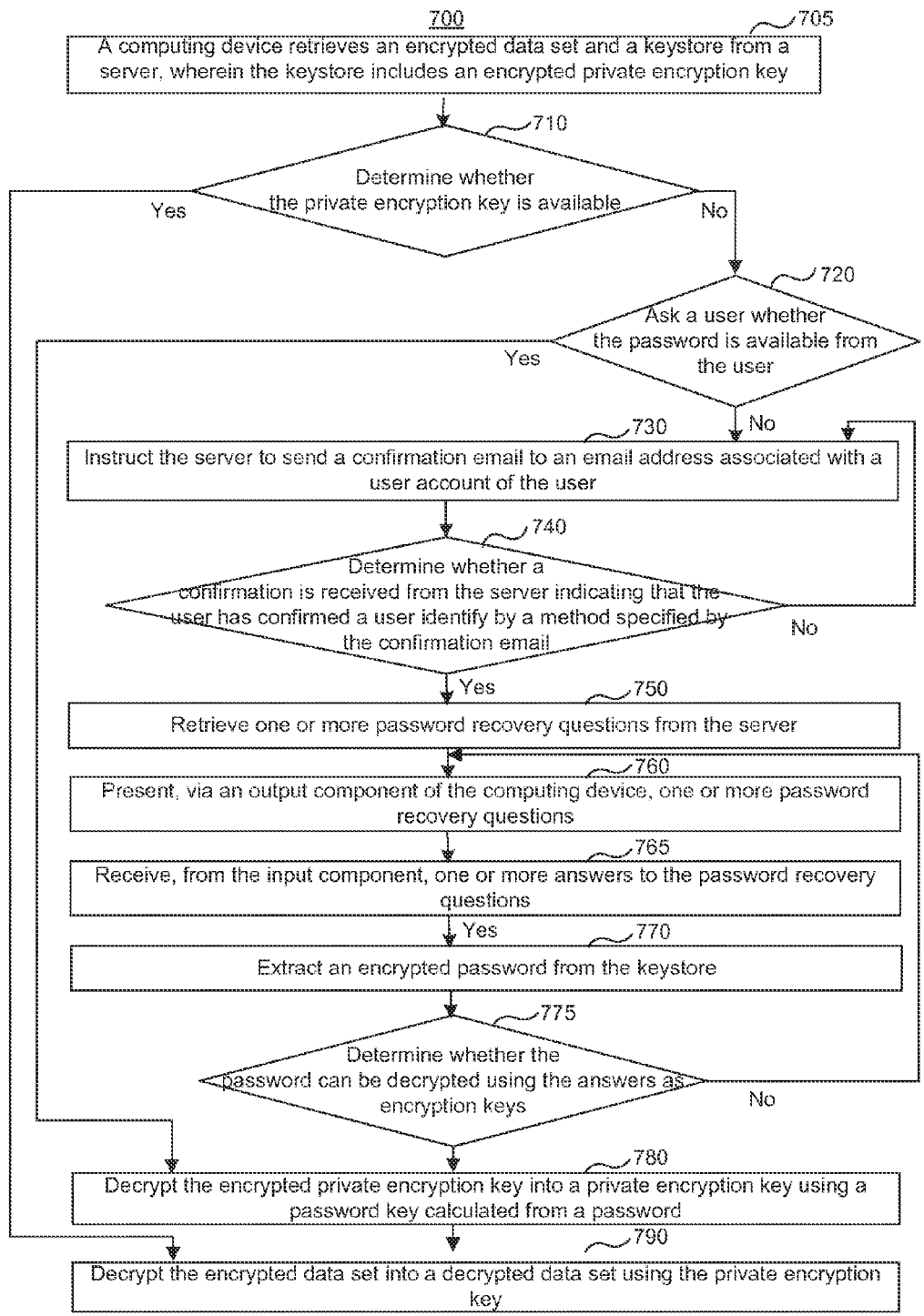
FIG. 7 illustrates an example of a process for recovering data of a computing device from a server.

Those skilled in the art will appreciate that the logic illustrated in FIG. 7 and described above, and in each of the flow diagrams discussed below if any, may be altered in a variety of ways. For example, the order of the logic may be rearranged, substeps may be performed in parallel, illustrated logic may be omitted, other logic may be included, etc. For instance, the private encryption key can be encrypted before any data of the computing device being encrypted.

The computing device can download the encrypted data from the server and decrypt the encrypted data. If the encryption key is not available to the computing device or a new computing device replacing this computing device, the encryption key can be recovered by decrypting the encrypted key using the password. If the password is not available to the computing device or a new computing device replacing this computing device, the password can be recovered by decrypting the encrypted password using answers to the password recovery questions provided by the user. FIG. 7 illustrates an example of a process 700 for recovering data of a computing device from a server. The process 700 starts at step 705, where the computing device retrieves an encrypted data set and a keystore from a server, wherein the keystore includes an encrypted private encryption key.

At step 710, the computing device determines whether the private encryption key is available. If the private encryption is available at the computing device, the process 700 proceeds to 790 to decrypt the data. If the private encryption is not available, the process 700 proceeds to 720 to ask a user whether the password is available from the user. If the password is available, the process 700 proceeds to 780 to decrypting the encrypted private encryption key. If the password is not available, the process 700 proceeds to step 730 to initiate a password recovery process.

At step 730, the computing device instructs the server to send a confirmation email to an email address associated with a user account of the user. At step 740, the computing device determines whether a confirmation is received from the server indicating that the user has confirmed a user identify by a method specified by the confirmation email. If not, the process 700 continues to instruct the user to send out confirmation emails at 730.

If the confirmation is received, at step 750, the computing device retrieves one or more password recovery questions from the server. At step 760, the computing device presents, via an output component of the computing device, one or more password recovery questions. At step 765, the computing device receives, from the input component, one or more answers to the password recovery questions. At step 770, the computing device extracts an encrypted password from the keystore. At step 775, the computing device determines whether the password can be decrypted from the encrypted password using the answers as encryption keys. If not, the process 700 may continue to prompt password recovery questions at step 760. If the password is decrypted, the process 700 proceeds to step 780.

At step 780 the computing device decrypts the encrypted private encryption key into a private encryption key using a password key calculated from a password. At step 790, the computing device decrypts the encrypted data set into a decrypted data set using the private encryption key. The computing device may use the decrypted data set for various purposes. For instance, the computing device may present the contents of the data set via an output component of the device, e.g. playing a video or displaying a photo. The computing device may feed the data sets to a computer application running at the computing device. Alternatively, the computing device may send out the data sets based on a user instruction.

Figure 8:
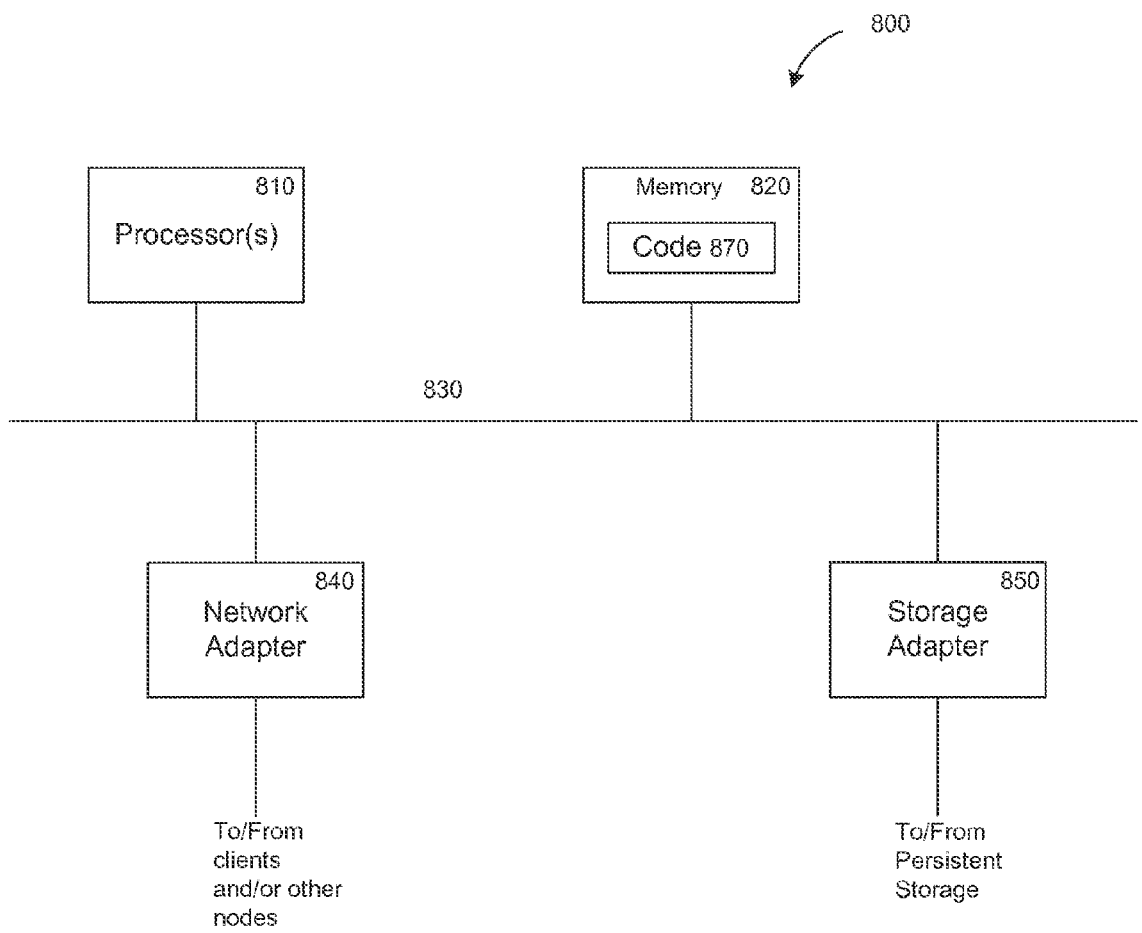
FIG. 8 is a high-level block diagram showing an example of the architecture of a computer, which may represent any computing device or server described herein.

FIG. 8 is a high-level block diagram showing an example of the architecture of a computer 800, which may represent any computing device or server described herein. The computer 800 includes one or more processors 810 and memory 820 coupled to an interconnect 830. The interconnect 830 shown in FIG. 8 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computer 800 and, thus, control the overall operation of the computer 800. In certain embodiments, the processor(s) 810 accomplish this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computer 800. The memory 820 represents any form of random access memory (RAM), read-only memory (ROM), flash memory, or the like, or a combination of such devices. In use, the memory 820 may contain a code 870 containing instructions according to the technology disclosed herein.

Also connected to the processor(s) 810 through the interconnect 830 are a network adapter 840 and a storage adapter 850. The network adapter 840 provides the computer 800 with the ability to communicate with remote devices, over a network and may be, for example, an Ethernet adapter or Fibre Channel adapter. The network adapter 840 may also provide the computer 800 with the ability to communicate with other computers. The storage adapter 850 allows the computer 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computer 800 by downloading it from a remote system through the computer 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer implemented method for recovering data encrypted server-side within a client-server distributed data storage system, the method comprising:
    maintaining an encryption at the computing device for encrypting data of the computing device into encrypted data;
    further maintaining a password at the computing device for recovering the encryption key from an encrypted encryption key when the encryption key is unavailable at the computing device; and
    transmitting the encrypted data and the encrypted encryption key to a server such that the server cannot access contents of the encrypted data stored in the server;
    wherein if the password is unavailable, the computing device is configured to recover the password from an encrypted password stored in the server,
    wherein the computing device encrypts the password into the encrypted password using at least one user-provided string, and the user-provided string represents an answer to a password recovery question,
    wherein if the password is unavailable at the computing device, the computing device is configured to receive at least one user-provided string from a user input component of the computing device as an answer to a password recovery question, and the computing device is further configured to attempt decrypting the encrypted password into the password using the user-provided string.

2. The computer implemented method of claim 1, wherein the server is suitable for storing the encrypted data, the encrypted encryption key, the encrypted password and the password recovery question such that the server is not able to successfully decrypt the encrypted data using any data stored in the server.

3. The computing implemented method of claim 1, wherein the server is suitable for sending the encrypted data, the encrypted encryption key, the encrypted password and the password recovery question to a replacement computing device replacing the computing device so that the replacement computing device can recover the data of the computing device.

4. A method for client side data encryption with a recovery mechanism, the method comprising:
    encrypting, at a computing device, a data set into an encrypted data set using a private encryption key, wherein the encrypted data set can be decrypted back into the data set by using the private encryption key;
    receiving, from a user input of the computing device, a password;
    encrypting, at the computing device, the private encryption key into an encrypted key using a password key calculated from the password;
    presenting, via an output of the computing device, one or more password recovery questions;
    receiving one or more recovery strings, wherein the one or more recovery strings are received from the user input as answers to the one or more password recovery questions;
    encrypting, at the computing device, the password into an encrypted password using the recovery strings; and
    transmitting the encrypted data set, the encrypted key and the encrypted password to a server, wherein the encrypted data set, the encrypted key and the encrypted password are suitable for use in the recovery mechanism and intended for storage on the server.

5. The method of claim 4, wherein the server is unable to access contents of the encrypted data set by using the encrypted key or the encrypted password.

6. The method of claim 4, wherein the steps of encrypting the data set, encrypting the private encryption key and encrypting the password use different encryption methods.

7. The method of claim 4, wherein the steps of encrypting the data set, encrypting the private encryption key and encrypting the password use a common encryption method.

8. The method of claim 4, further comprising:
    generating, by the computing device, the private encryption key.

9. The method of claim 4, wherein the data set includes one or more files of the computing device.

10. The method of claim 4, further comprising:
    storing the encrypted key and the encrypted password in a keystore; and
    wherein the encrypted key and the encrypted password are transmitted to the server as the keystore.

11. The method of claim 4, further comprising:
    receiving, from the server, a message indicating that server receives the encrypted data set; and
    removing, at the computing device, the data set and the encrypted data set in response to the message.

12. The method of claim 4, wherein the password key comprises the password.

13. The method of claim 4, further comprising:
    generating, at the computing device, an updated data set that is an updated version of the data set;
    encrypting, at the computing device, an encrypted updated data set using the private encryption key; and
    transmitting the encrypted updated data set to the server and instructing the server to replace the encrypted data set with the encrypted updated data set.

14. A method for recovering data of a computing device from a server, comprising:
    retrieving, at a computing device, an encrypted data set and a keystore from a server, wherein the keystore includes an encrypted private encryption key;
    receiving, from an input component of the computing device, a user message indicating that the user does not possess a password;

recovering the password via a password recovery process, wherein the password recovery process includes:
  presenting, via an output component of the computing device, one or more password recovery questions,
  receiving, from the input component, one or more answers to the password recovery questions,
  extracting an encrypted password from the keystore, and
  decrypting the encrypted password into the password using the answers as encryption keys;
decrypting, at the computing device, the encrypted private encryption key into a private encryption key using a password key calculated from the password; and
decrypting, at the computing device, the encrypted data set into a decrypted data set using the private decryption key.

15. The method of claim 14, wherein the password recovery process further includes:
  retrieving, at the computing device, one or more password recovery questions from the server.

16. The method of claim 14, wherein the password recovery process further includes:
  instructing, by the computing device, the server to send a confirmation email to an email address associated with a user account of the user; and
  receiving, at the computing device, a confirmation from the server indicating that the user has confirmed a user identify by a method specified by the confirmation email.

17. The method of claim 14, wherein the steps of decrypting the encrypted private encryption key and decrypting the encrypted data set use different decryption methods.

18. The method of claim 14, wherein the server does not have access to the content of the encrypted data set.

19. A computing device, comprising:
  a processor;
  a data encryption module which, when executed by the processor, encrypts data sets of the computing device into encrypted data sets using an encryption key;
  a keystore module which, when executed by the processor, encrypts the encryption key into an encrypted encryption key using a user recovery password provided by a user of the computing device;
  a networking interface configured to transfer the encrypted data sets and the encrypted encryption key to a server;
  wherein the server does not have access to the user recovery password and does not have access to contents of the encrypted data sets,
  wherein the computing device is configured to recover the user recovery password by a password recovery process,
  wherein the user recovery password is encrypted into an encrypted user recovery password by at least one password recovery answer provided by the user, and the encrypted user recovery password is transferred to the server; and
  wherein the password recovery process includes:
    presenting, via an output component of the computing device, at least one password recovery question;
    receiving, from an input component of the computing device, the at least one answer to the at least one password recovery question;
    retrieving, from the server, the encrypted user recovery password; and
    decrypting the encrypted user recovery password into the user recovery password using the at least one password recovery answer.

20. The computing device of claim 19, wherein the networking interface is further configured to retrieve the encrypted data sets and the encrypted encryption key from a server;
  wherein the keystore module is further configured to decrypt the encrypted encryption key into the encryption key using the user recovery password when the encryption key is not available at the computing device; and
  wherein the data encryption module is further configured to decrypt the encrypted data sets into the data sets using the encryption key.

* * * * *